C. P. Loeser,
Bed Head-Section,
No. 60,913. Patented Jan. 1, 1867.
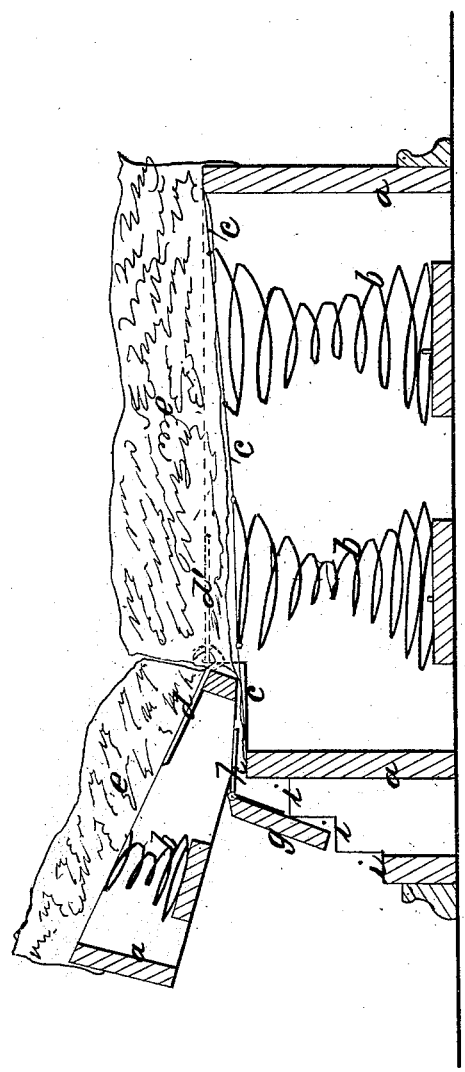
Witnesses;
Annie Stone
Jeremy W. Bays
Inventor,
C. P. Loeser

United States Patent Office.

CHARLES P. LOESER, OF HARTFORD, CONNECTICUT.

Letters Patent No. 60,913, dated January 1, 1867.

---

IMPROVED BED BOTTOM.

---

The Schedule referred to in these Letters Patent and making part of the same.

---

TO ALL WHOM IT MAY CONCERN:

Be it known that I, CHARLES P. LOESER, of Hartford, county of Hartford, and State of Connecticut, have invented certain new and useful improvement in Bed Bottoms; and to enable others skilled in the art to make and use the same, I will proceed to describe it, referring to the drawings, in which the same letters indicate like parts in each of the figures.

The nature of this improvement consists in forming a hook, or other easily attachable or detachable connection, at that point where the two parts are united together.

In the accompanying drawings are shown a section plan, elevation, of this improvement. $a$ is the framework. $b$ are the springs arranged inside of the framework in the usual way. $c$ is a cord, which should be firmly secured to the springs and framework, so as to hold them in their proper position, whether the bed rests upon them or not. $d$ are hook and eye plates, one of which has a hook formed on one end thereof, and is secured to the elevating portion of the framework. $d'$ has an eye formed in one end thereof, and is secured to the stationary portion of the framework; in this way the head portion can be readily attached or detached when desirable. $e$ is the bed or mattress, laid upon the bed bottom, or secured thereto in any proper manner. $g$ is a supporter, which extends across the whole width of the bottom, and is secured to the under side of the elevating portion of the bottom by hinges, $h$, which takes its bearing on the steps, $i$, formed in the framework $a$. Now, when it becomes desirable to elevate the head portion of the bed, it is only necessary to lift the head and place the supporter upon one or the other of the steps, $i$, to elevate the head more or less, as desirable; and when desirable to detach one part from the other, it is only necessary to turn up the head part, so as to allow the hooks to escape from the eye of the other part, thus cheapening the construction, and producing a better and more desirable and convenient article.

I believe I have thus shown the nature, construction, and advantage of this improvement, so as to enable others skilled to make and use the same therefrom.

I claim the hook and eye plates $d\ d'$, framework $a$, springs $b$, supporting cord $c$, with the supporter $g$ and steps $i$, substantially as and for the purpose described.

C. P. LOESER. [L. S.]

Witnesses:
ANNIE STONE,
JEREMY W. BLISS.